United States Patent [19]
Edwards et al.

[11] 3,767,992
[45] Oct. 23, 1973

[54] SERVO APPARATUS

[75] Inventors: Harrison F. Edwards; Stewart F. Bottorf, both of Naugatuck, Conn.

[73] Assignee: The Lewis Engineering Company, Naugatuck, Conn.

[22] Filed: Aug. 23, 1971

[21] Appl. No.: 173,748

[52] U.S. Cl.............. 318/640, 250/231, 324/99 R
[51] Int. Cl. .............................................. G05b 1/06
[58] Field of Search................ 318/640; 324/99 R; 250/211 K, 231, 210

[56] References Cited
UNITED STATES PATENTS

| | | | |
|---|---|---|---|
| 3,450,969 | 6/1969 | Sato et al. | 318/640 |
| 2,934,654 | 4/1960 | Pakan | 250/210 X |
| 3,358,150 | 12/1967 | Summer | 250/211 K |
| 3,596,100 | 7/1971 | Hollick | 250/210 |
| 3,340,785 | 9/1967 | Adler | 318/640 X |
| 3,539,816 | 11/1970 | Chamberlin | 250/211 K |

*Primary Examiner*—B. Dobeck
*Attorney*—H. Gibner Lehmann

[57] ABSTRACT

A servo device which has but a single movable part that is essentially frictionless and which thus eliminates the usual gears and instead utilizes a galvanometer-type movement in a servo feedback loop arrangement. The galvanometer is associated with a bridge circuit and a novel light-cell control which is actuated by the galvanometer. The novel control comprises a movable element adapted to modify a light beam which is produced for the purpose of striking the light cell disposed in one bridge leg, and which originates at an electric lamp. Another leg of the bridge includes a condition-responsive element responding to heat, cold or other conditions in a manner to unbalance the bridge, the balance of which is then re-established by deflection of the galvanometer to activate the light control so as to modify the influence of the light cell (in the one bridge leg). The position of the movable element or coil of the galvanometer can be an indication of the magnitude of the cold, heat or other condition which is being monitored. The device can function as a position transducer for angular or linear values, as a basic function generator, including an electrical as well as mechanical output. By virtue of the single moving part there is had a desirable simplicity and reduced cost, with lower maintenance expense while at the same time accuracy is not sacrificed.

14 Claims, 15 Drawing Figures

INVENTORS
Harrison F. Edwards
Stewart F. Bottorf

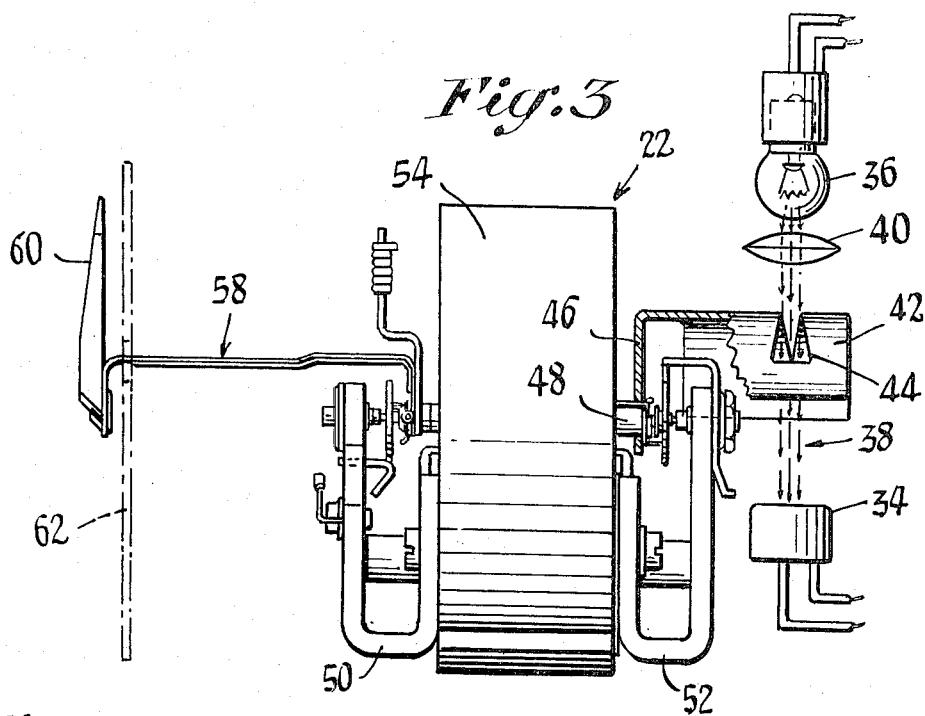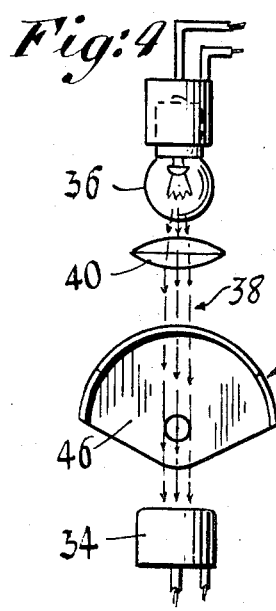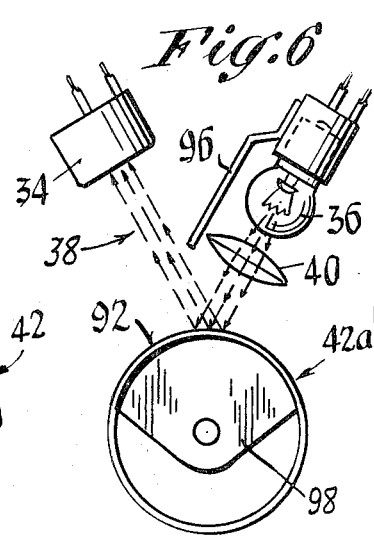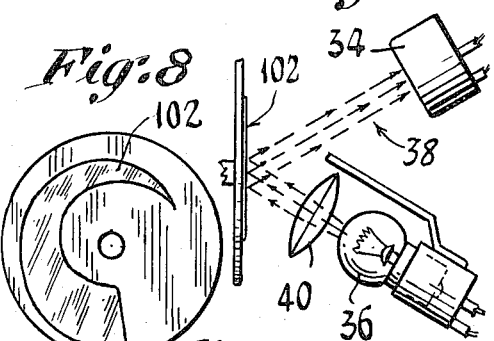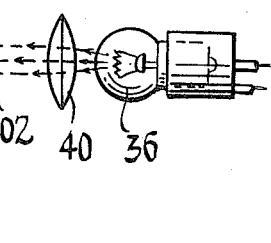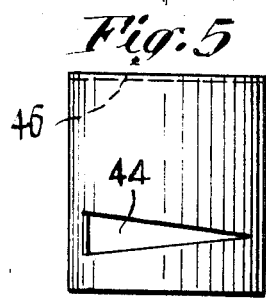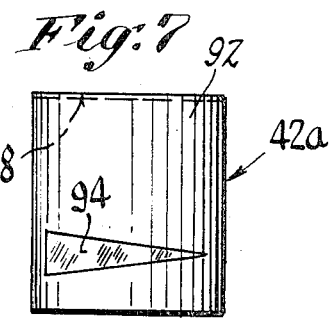

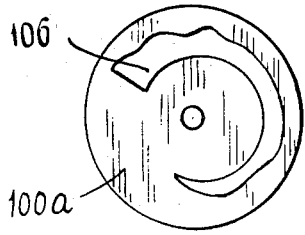
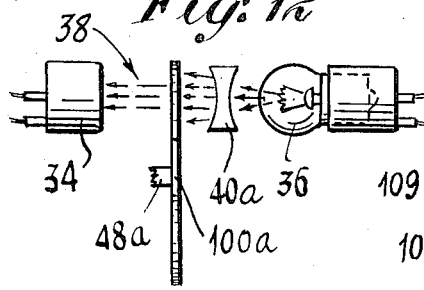
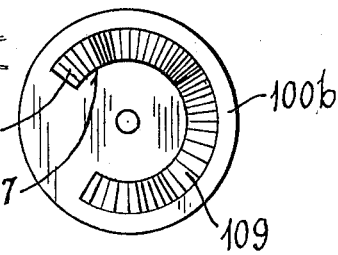
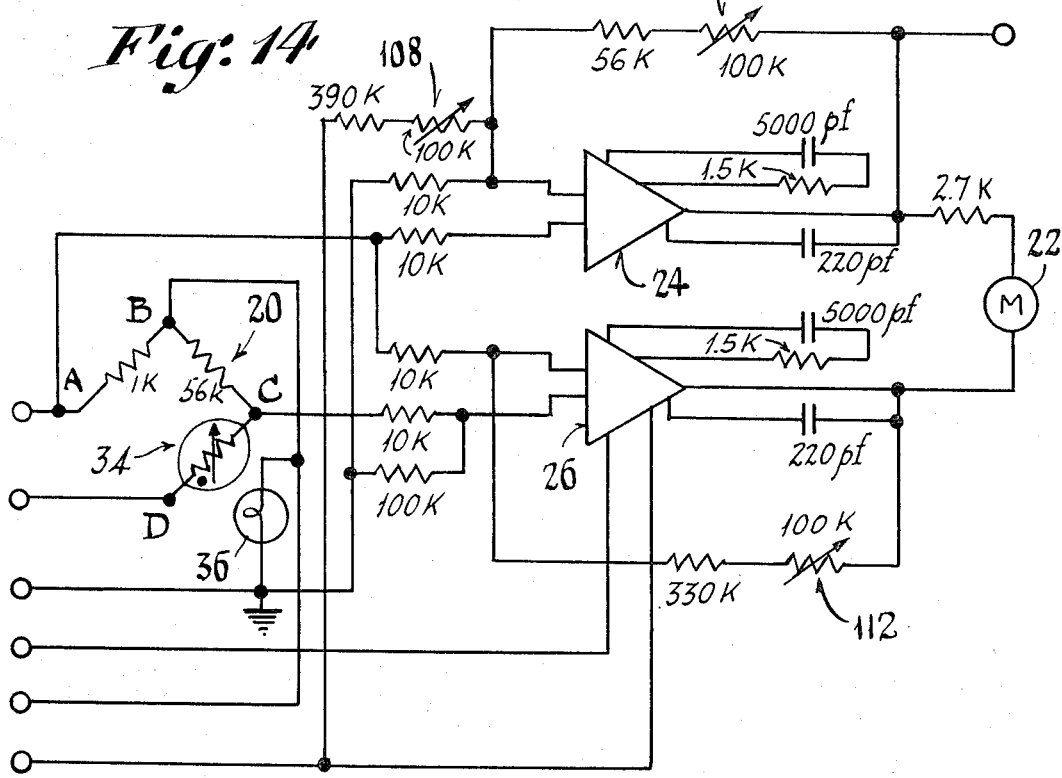
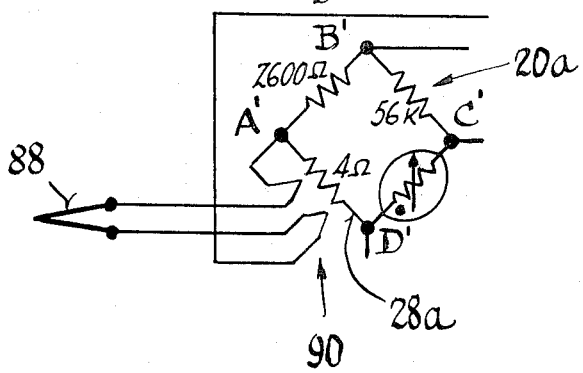

SERVO APPARATUS

BACKGROUND

This invention relates to servo and like devices, and more particularly to systems of this type that involve transducers which are sensitive to and influenced by heat, cold, light or other conditions to be measured or controlled. Heretofore, servo-indicator or control devices utilized reversible motors and systems of gears to provide the desired indications and controls. The prior devices thus required appreciable power and involved a multiplicity of moving parts, as well as being quite costly to produce and expensive with respect to maintenance. The prior devices were also relatively complicated and large, all of which made their use prohibitive for many applications.

SUMMARY

The above disadvantages and drawbacks of prior, servo-type devices are obviated by the present invention, which has for one of its objects the provision of a novel and improved low power yet sensitive servo-type instrument wherein the number of moving parts is reduced to an absolute minimum, and wherein the fabrication and maintenance costs are also appreciably reduced, thereby expanding considerably the field of usefulness of the device. Related objects are to provide an improved servo device as above set forth, wherein standard components already available on the market can be largely utilized, with relatively few special parts being needed, wherein the entire device is relatively small and compact, completely portable, and operable on minute currents such as are obtainable from batteries if this should be desired.

The above objects are accomplished by the provision of a wheatstone bridge and galvanometer with interposed solid state amplifiers so arranged as to increase the energy to the galvanometer when a bridge unbalance occurs. In one bridge leg is a condition-sensitive transducer, and in another leg a light-sensitive cell. A light-emissive device provides a light beam for the cell, said beam being modified by a tapered or otherwise non-monotonous element such as a reflector, slotted member, film or disk which is actuated by the movable system of the galvanometer and connected with an indicator or control. Unbalance of the bridge occasioned by a change in the condition sensed by the transducer deflects the galvanometer which in turn alters the light to the cell so as to re-establish the bridge balance. The new, deflected position of the galvanometer thus indicates the new condition affecting the transducer, whereby the galvanometer positions are a function of the conditions sensed by the transducer and programmed by the light-beam control. The galvanometer movable element constitutes the single moving part of the device, and all components can be small, compact and lightweight with little power needed.

Still other features and advantages will hereinafter appear.

In the accompanying drawings showing a number of different embodiments of the invention:

FIG. 3 is a side elevational view of the instrument movement of FIG. 2, showing in addition to other details the light beam control associated therewith.

FIG. 4 is a diagrammatic representation constituting a fragmentary rear view of the light beam control of FIGS. 1 and 3.

FIG. 5 is a top plan view of the light beam controlling element of the light beam control of FIG. 4.

FIG. 6 is a rear elevational view of a light beam control somewhat similar to that of FIG. 4, but illustrating another embodiment of the invention involving a reflector-type beam modifying device.

FIG. 7 is a top plan view of the light-modifying member of FIG. 6.

FIG. 8 is a rear elevational view of another type of light-beam modifying element, constituting yet another embodiment of the invention.

FIG. 9 is a diagrammatic representation of a light-beam control incorporating the element of FIG. 8.

FIG. 10 is a diagrammatic representation in the form of a side elevational view of the light beam control of FIGS. 8 and 9.

FIG. 11 is a rear elevational view of a light-beam modifying element constituting yet another embodiment of the invention.

FIG. 12 is a diagrammatic representation of a light-beam type control utilizing the element of FIG. 11.

FIG. 13 is a rear elevational view of a light-beam modifying or controlling element constituting still another embodiment of the invention.

FIG. 14 is a schematic circuit diagram of the novel wheatstone bridge, amplifier system and galvanometer combination as provided by the invention.

FIG. 15 is a schematic bridge circuit diagram showing a different type of transducer to be used with the diagram of FIG. 14 in place of the bridge circuit shown therein.

Figure 1:
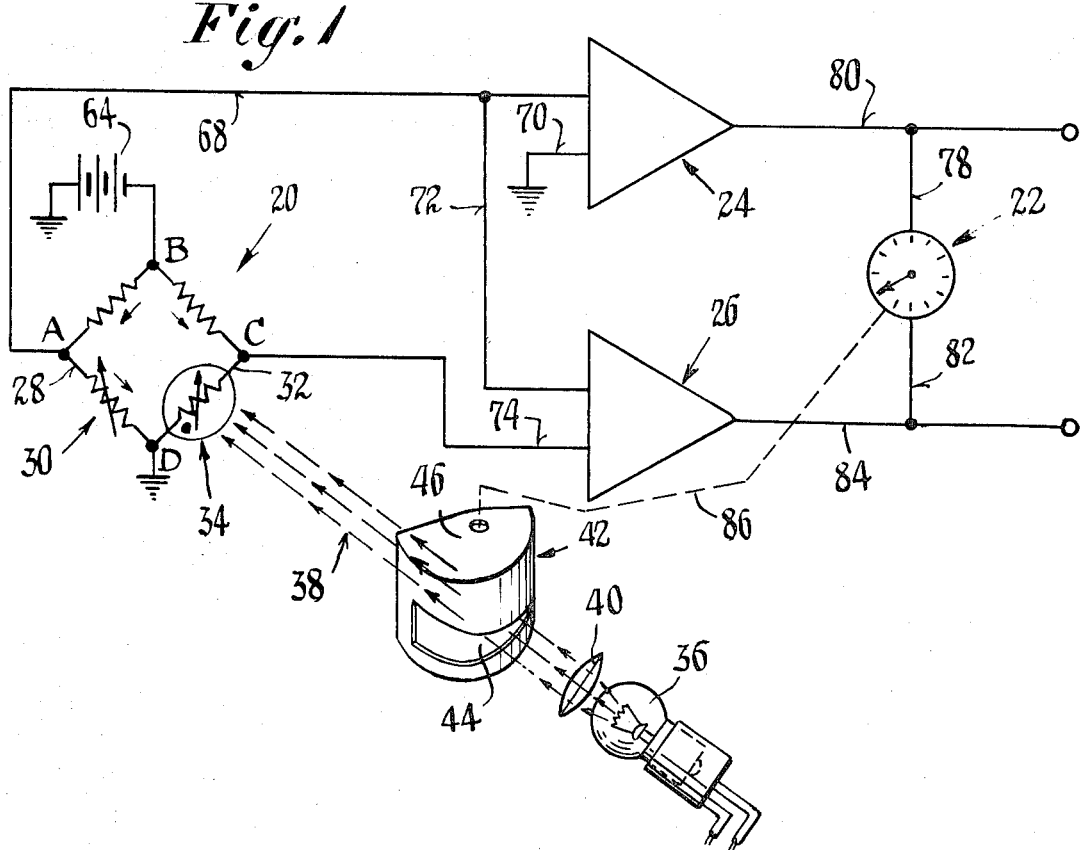
FIG. 1 is a part diagrammatic part block diagram representation of the servo device of the invention, this figure illustrating one embodiment thereof.
Figure 2:
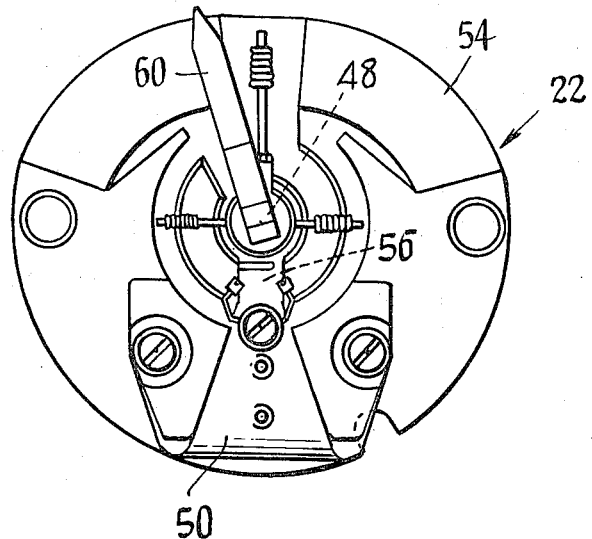
FIG. 2 is a front elevational view of an instrument movement of the D'Arsonval or galvanometer type as used with the servo system of the invention.

Considering first FIGS. 1-5, there is illustrated a wheatstone bridge designated generally by the numeral 20, and a galvanometer 22 with interposed solid state amplifiers 24, 26 respectively, the amplifiers being so arranged as to increase the energy to the galvanometer when a bridge unbalance occurs.

In one bridge leg 28 there is interposed a condition-responsive transducer 30 which can, for example, be a resistance thermometer bulb, and as provided by the invention in another symmetrically disposed bridge leg 32 there is connected a light sensitive cell 34 which is shown as being of the variable conductance type. A small incandescent electric lamp 36 is provided, supplying a light beam 38 arranged to strike the light sensitive cell 34. A condensing lens 40 is shown as concentrating the beam 38 in the well known manner.

In accordance with the present invention, according to one embodiment thereof, the light beam 38 is modified or varied by a tapered or non-monotonous element 42 comprising a segment of a cylinder having a tapered slot 44 through which the beam 38 passes. The member 42 has a transverse supporting wall 46 which is secured to the movable system or spindle 48 of the instrument movement or galvanometer 22. Such instrument movement can in large part be of conventional construction, having front and rear bearing or pivot support members 50, 52 respectively, a permanent magnet field structure 54, a moving coil 56 carried by the spindle 48, and a pointer assemblage 58 including a pointer or index member 60. Associated with the pointer 60 is a dial 62.

The arrangement is such that deflection of the movable coil system of the galvanometer 22 results in deflecting movement of the beam-controlling element or member 42 about the axis of the instrument movement.

In FIG. 3 the light sensitive cell 34 is shown below the beam-controlling member 42, with the lamp 36 and condensing lens 40 above the element, arranged in such a manner that the beam of light from the lamp can pass through the tapered slot 44 of the member 42 and strike the light cell 34. Depending on the rotative position of the galvanometer moving assemblage, either more or less light will strike the cell 34 since the beam 38 is more or less cut off due to the tapered shape of the controlling slot 44.

It will be readily understood from FIGS. 3 and 4 that the light sensitive cell or photosensitive device 34 has an expansive sensing surface which is struck by a part of the beam 38, since the light cell is shown as having a cylindrical configuration (note shading). Such cylindrically jacketed cells are commercially available and well known, and the end surfaces thereof have fields of appreciable expanse. Light striking any portion of such a field causes a response of the cell, as is well known in the art. Since the beam-controlling member 42 intercepts portions of the beam 38, it is clear that the tapered slot 44 of the member 42 will give rise to a shadowed area on the sensing surface, and in the case of the member 42 having a slot 44 of the configuration shown in FIG. 1, the shadowed area will be defined by spaced apart marginal border portions, between which there exists a beam having a pointed or tapered, wedge-like cross section defined by the outline of the slot. In addition it is clear that the distance between the border portions will vary according to a predetermined pattern which is directly related to the particular shape of the slot 44. The border portions in turn define spaced apart lines of separation between the shadowed areas and the wedge-shaped illuminated area on the sensing surface. It is to be further understood that the expanse of the shadowed areas on the surface continuously vary in response to gradual movement of the beam controlling member 42, such variation giving rise to a change in the response of the light sensitive cell 34.

As best illustrated in FIG. 1, the member 42 will block out spaced apart areas of the sensing surface of the cell 34 which in turn will produce spaced-apart shadowed areas thereon that are separated by a wedge-shaped illuminated area of the surface (due to the tapered shape of the controlling slot 44). The member 42 having the slot 44 thus constitutes a movable means comprising an opaque member having means for passing light through portions of it. For a given shape of the slot 44, as illustrated in FIG. 1, the illuminated area on the sensing surface of the cell 34 will have a wedge shape, but it is clear that other slot configurations will give rise to different illumination/shadow patterns.

Considering again FIG. 1, one set of opposite corners B, D of the bridge 20 is energized from a battery 64 having one terminal grounded. A corner terminal A of the bridge 20 is connected by a line 68 to what I term a "positioning amplifier," constituting the amplifier 24 whose other input lead 70 is grounded. Thus, the positioning amplifier 24 will be responsive to the potential across the leg 28 of the bridge 20, and it will be seen that the condition-responsive transducer 30 comprises the said leg whereby voltage variations across the transducer will also be present at the input of the positioning amplifier 24.

Further, in accordance with the invention, the amplifier 26 which we term herein a "null" amplifier has one input lead 72 connected to the input lead 68 of the amplifier 24 and has its other input lead 74 connected to the bridge corner C which is opposite the corner A. Thus, the input to the null amplifier 26 will be taken from the opposite bridge corners A, C, and will be subjected to voltage differences between the said bridge corners.

The positioning amplifier 24 is so arranged as to drive the galvanometer 22 upscale. In effecting this, the galvanometer has a lead 78 connected to an output line 80 of the positioning amplifier 24 and has a second lead 82 connected to an output line 84 of the null amplifier 26.

The null amplifier 26 provides an output which is opposite in polarity to that of the positioning amplifier and therefore drives the meter or galvanometer 22 even more rapidly upscale when an unbalanced condition of the bridge 20 exists. For a balanced condition of the bridge 20, the null amplifier 26 has zero output, and the galvanometer 22 indicates the difference between the amplifier outputs.

In FIG. 1 the mechanical connection between the movable system of the galvanometer 22 and the light-beam modifying member 42 is indicated by the broken line 86. The operation of the bridge-galvanometer light-control servo device of the present invention can now be understood. Referring to FIG. 1, assuming a balanced condition of the bridge, the output of the amplifier 26 would be zero, and the galvanometer 22 will have a predetermined position by which a certain amount of light from the lamp 36 is allowed to strike the light-sensitive cell 34 so as to balance out the transducer 30 which is subjected to a condition such as heat, cold, etc. Since the galvanometer 22 is at rest, the pointer 60 thereof will have a definite indicating position, and the dial 62 can be graduated in various units depending on the use to which the servo system is put. The indication of the pointer 60 on the dial 62 accordingly can be an indication of the condition to which the transducer 30 responds. For example, the dial 62 can be calibrated in degrees temperature or various other units, as is well understood. Upon a change in the condition influencing the transducer 30, the latter will change its electrical characteristic and effect an unbalance of the bridge 20. This will result in the amplifiers 24, 26 driving the galvanometer either upscale or downscale, depending on the direction of change of the condition.

Deflection of the galvanometer will result in the light beam 38 being modified by the beam controlling member 42 so as to allow either more or less light to strike the light-sensitive cell 34. The change in light and the response of the cell 34 is such as to re-establish the balance of the bridge; the galvanometer will deflect the required extent to supply the necessary amount of light to the cell for effecting such balance. Upon the bridge again becoming balanced, the galvanometer needle 60 will now have a new position, indicating a new value on the dial 62 which corresponds to the new value of the condition which influences the transducer 30.

Accordingly, the response of the galvanometer 22 is seen to be a function of the changes in the condition which influences the transducer. The galvanometer thus can function as a position transducer for angular or even for linear values, since conversion from angular to straight line motion can be readily effected either optically or by other suitable means. The present servo-system can also operate as a basic function generator, giving an electrical as well as a mechanical output. For example, the output of the light-sensitive cell 34 can be utilized to excite other electronic equipment. Instead of the cell being of the conductive type, it can be of the generative type, whereby a voltage is generated as a result of light striking the cell.

Also, the transducer 30 can be in the form of a thermocouple 88 as illustrated in FIG. 15, such thermocouple being connected by a cold junction arrangement 90 to a leg 28a of a bridge circuit 20a which is substitutable for the bridge 20 in FIG. 1. The four corners of the bridge have been labelled A, B, C and D, and in FIG. 15 the corresponding four corners of the bridge therein have been labelled A', B', C' and D' respectively, thereby to indicate the proper connections to be followed in substituting the bridge 20a in FIG. 15 for the bridge 20 of FIG. 1.

The amplifiers 24, 26 can be of the solid state variety, both incorporated in a single chip of miniature size. Likewise, the wheatstone bridge 20 requires but little space and the same is true of the lamp 36 and optical system involving the lens 40, light beam control member 42 and light sensitive cell 34. Also, instrument movements of the D'Arsonval type are currently manufactured so as to require relatively little space, whereby the entire servo unit can be especially small and compact, and of light weight. Further, the electrical energization needed can be supplied from small batteries whereby the entire unit is readily portable. Servicing is kept to a minimum inasmuch as but a single movable part is involved, that comprising the movable system of the galvanometer which carries the light beam control member. A high degree of accuracy and reliability is had in the servo system, and the fabrication cost can be relatively low.

Another embodiment of the invention is illustrated in FIGS. 6 and 7. In these figures the light beam control member 42a comprises a segment of a cylinder having a cylindrical wall surface 92 which is provided with a tapered reflective member or surface 94. As seen in FIG. 6, the light sensitive cell 34 and the incandescent lamp 36 are both located at the exterior of the member 42a, together with the condensing lens 40. An opaque light shield 96 prevents stray light from the lamp 36 from striking the light sensitive cell 34. Accordingly, the cell 34 receives its light by reflection from the reflector 94. As the member 42a is arcuately shifted, either a greater or a smaller reflective area of the element 94 is available for directing light from the lamp 36 against the light sensitive cell 34. Accordingly, the position of the control member 42a determines the amount of light which is received by the cell 34. The member 42a has a sector shaped transverse wall 98 by which it can be mounted on the spindle 48 of the galvanometer 22.

Still another embodiment of the invention is illustrated in FIGS. 8-10 wherein a disk-shaped light beam control member 100 has a crescent-shaped reflector element 102 of generally tapered configuration. The light beam control member 100 can be mounted on the galvanometer spindle 48 in place of either the members 42 or 42a. As seen in FIGS. 9 and 10, the incandescent lamp 36 directs light through a lens 40 against the reflector 102, from which the light beam is directed to the light sensitive cell 34. The action of the light beam control shown in FIGS. 8-10 is accordingly seen to be similar to that illustrated in FIGS. 6 and 7, with the exception that the beam control member 100 comprises merely a flat disk, whereas the beam control member 42a in FIGS. 6 and 7 comprises a segment of a cylinder.

Yet another embodiment of the invention is illustrated in FIGS. 11 and 12. In these figures, a flat light-beam control member 100a adapted for mounting on the galvanometer spindle 48a has a larger radius than the member 100. The member 100a is provided with a generally tapered or crescent-shaped slot 106, wherein the taper is not regular but instead non-monotonous, having an irregular configuration intended to modify the light beam according to a predetermined pattern or plan. As seen in FIG. 12, the incandescent lamp 36 and a diffusing lens 40a are disposed on one side of the light beam control member 100a, whereas the light sensitive cell 34 is disposed on the opposite side. Light passing through the slot 106 and striking the cell 34 causes either a greater or lesser response of the cell, depending on the extent of the area of the slot 106 through which the light passes. By varying the configuration of the slot 106, various characteristics can be built into the light beam control to suit particular conditions of use. It will be understood that the reflector 94 of FIG. 7, or 102 of FIG. 8 can also be given an irregular or specific contour different from that shown, to impart the desired control characteristics thereto.

Yet another embodiment of the invention is illustrated in FIG. 13, wherein a light-controlling member 100b has an arcuate aperture 107 which is spanned by a translucent film 109 having a graduated opacity, with some intermediate portions made purposely less translucent to provide a desired, non-uniform characteristic. By properly laying out the translucency of the film, many varied characteristics can be obtained. The member 100b could be used in place of the member 100a shown in FIG. 12, as can be understood. Referring to FIG. 3, it can be seen that the beam modifying member 42 is capable of limited arcuate movement through an arc of less than 360°, due to interference which would be encountered with the support member 52. Similarly, the reflecting type member 42a of FIGS. 6 and 7, and member 100 of FIGS. 8-10 are also limited to arcuate movement of less than 360°.

FIG. 14 provides more details of the circuitry involving the wheatstone bridge 20 and positioning and null amplifiers 24, 26. The lamp 36 is shown as provided with a potential of 5 volts, and 9 volt potentials are provided for the amplifiers 24, 26. Since the lamp 36 receives a constant 5 volt excitation, the light output or amplitude thereof is maintained substantially constant during the operation of the apparatus. The potential applied to the wheatstone bridge 20 is also seen to be 5 volts. The galvanometer 22 can be of a sensitivity which provides full scale deflection for from 0 to 2 milliamperes or other sensitivities as desired. The various values of resistors and capacitors associated with the amplifiers, bridge and galvanometer are indicated on the circuit, together with the connections of the various components. One skilled in solid state circuitry will be able to readily produce the system illustrated in FIG. 14 from the information given. The amplifiers 24, 26, both on a single chip, are commercially available products, identified by the number MC1437L. In place of the exact amplifier chip designated, equivalent amplifier chips can be utilized, either with or without alteration of the circuitry depending on the various requirements.

It will now be seen from the foregoing that we have provided a novel and improved servo device with feedback loop, characterized by a wheatstone bridge, galvanometer, and energy boosting amplifiers which provide outputs of opposite polarity, connected to the galvanometer to drive the instrument at an increased rate. The movable system of the galvanometer, comprising the only movable part of the servo apparatus, actuates a light beam control including a light sensitive cell which is incorporated in one leg of the wheatstone bridge. Another leg of the wheatstone bridge incorporates the condition-sensitive or condition responsive transducer with which the servo apparatus is to be used. As already mentioned, the different positions of the galvanometer to effect a balance of the bridge for changes in the condition being monitored constitute an indication of the condition, whereby the galvanometer serves as a function generator or as a position transducer, with either angular or linear output values. Either an electrical or mechanical output can be obtained from the galvanometer 22. Calibration of the system is possible to obtain an initial setting depending on the particular brilliance of the lamp 36 at any time. This can be effected by the variable resistor 108 shown in FIG. 14. Variable resistors 110 and 112 associated respectively with the amplifiers 24, 26 enable adjustment of the outputs of these to be effected.

Variations and modifications are possible without departing from the spirit of the invention.

We claim:

1. A galvanometer-type servo device comprising in combination:
   a. a bridge having four legs which constitute interrelated circuits,
   b. condition-responsive means connected with one leg of said bridge for effecting an unbalance of the latter in response to changes in a condition,
   c. said bridge having terminals comprising output means connected to said legs,
   d. amplifying means having input and output circuitry, said input circuitry being connected to said output means to receive energy therefrom,
   e. a galvanometer connected to the output circuitry of the amplifying means to be operated thereby,
   f. a movable light-control member coupled to the galvanometer to be actuated thereby,
   g. a source of light having substantially constant amplitude,
   h. a light-sensitive conversion device connected to one of the legs of said bridge and adapted to receive light from said source,
   i. said movable light-control member being disposed in the path of light from the source to said conversion device and having light-controlling means cooperable with said light source and conversion device, for progressively diminishing or increasing the amount of light which passes from the source to the conversion device in response to movement of the member whereby any change in said condition which causes an unbalance of the bridge results in a deflection of the galvanometer to alter the light striking said conversion device in a manner that causes reestablishment of the bridge balance, and
   j. indicating means coupled to said galvanometer to be actuated thereby, said indicating means, comprising a scale having indicia adapted to designate values, and an index member, said scale and said index member being movable with respect to one another for designating values on said scale.

2. The invention as set forth in claim 1, wherein:
   a. said light-controlling means comprises a turnably mounted reflector having a tapered reflecting surface, said reflector being adjustable through an arc of less than 360°.

3. The invention as set forth in claim 2, wherein:
   a. said movable control member is rotatably mounted and comprises a segment of a cylinder, and
   b. said tapered reflector has a curvature with a center at the axis of the control member.

4. The invention as set forth in claim 1, wherein:
   a. the movable control member is rotatably mounted and comprises a segment of a cylinder,
   b. said light-controlling means comprising edge portions of the member.

5. The invention as set forth in claim 4, wherein:
   a. said edge portions of the member comprise an aperture therethrough.

6. The invention as set forth in claim 1, wherein:
   a. said movable control member is carried directly by the moving system of the galvanometer and has arcuate movement.

7. The invention as set forth in claim 1, wherein:
   a. said control member comprises a sheet-like formation having opposite sides, and
   b. said light-controlling means constitutes a tapered configuration of said control member, enabling more or less light to pass from one side of the member to the other.

8. The invention as set forth in claim 7, wherein:
   a. said tapered configuration comprises edge portions of an aperture in the control member.

9. The invention as set forth in claim 1, wherein:
   a. the control member comprises a sheet-like formation having opposite sides, and
   b. said light-controlling means comprises a tapered reflector carried by said member.

10. The invention as set forth in claim 1, wherein:
    a. said light-controlling means comprises edge portions of a tapered aperture in the member.

11. The invention as defined in claim 1, wherein:
    a. the light-controlling means constitutes edge portions of an aperture in the member, and
    b. a translucent film disposed across the aperture to reduce the intensity of the light passing therethrough.

12. The invention as defined in claim 1, wherein:
    a. said amplifying means comprises a pair of amplifiers providing output circuitry respectively of opposite polarity to operate the galvanometer.

13. The invention as defined in claim 12, wherein:
    a. the input circuitry of the first amplifier is connected across the condition-responsive means, and
    b. the input circuitry of the second amplifier is connected to legs of the bridge which do not include the condition-responsive means.

14. The invention as defined in claim 1, wherein:
    a. said light-controlling means is non-monotonous, thereby to enable various predetermined operation characteristics of the servo-device to be had.

* * * * *